(12) United States Patent
Sain et al.

(10) Patent No.: US 11,356,391 B2
(45) Date of Patent: Jun. 7, 2022

(54) AUTOMATIC CONFERENCING CHANNEL FOR ROLE-BASED COLLABORATION

(71) Applicant: The Boeing Company, Chicago, IL (US)

(72) Inventors: Kenneth W. Sain, Greenwood Village, CO (US); Andreas Sindlinger, Weinheim (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/355,985

(22) Filed: Jun. 23, 2021

(65) Prior Publication Data

US 2022/0038399 A1 Feb. 3, 2022

Related U.S. Application Data

(60) Provisional application No. 63/057,680, filed on Jul. 28, 2020.

(51) Int. Cl.
*H04L 12/58* (2006.01)
*H04L 51/02* (2022.01)
(Continued)

(52) U.S. Cl.
CPC ........ *H04L 51/02* (2013.01); *G06Q 10/06311* (2013.01); *H04L 65/403* (2013.01); *G06Q 10/10* (2013.01); *H04L 67/18* (2013.01)

(58) Field of Classification Search
CPC ..... G06Q 10/063114; G06Q 10/06311; G06Q 10/00; G06Q 10/06; G06Q 10/101;
(Continued)

(56) References Cited

U.S. PATENT DOCUMENTS 7,386,535 B1 * 6/2008 Kalucha ................. G06Q 10/06
2006/0047558 A1 * 3/2006 Uchiyama ............. G06Q 10/00
705/7.16
(Continued)

OTHER PUBLICATIONS

S4A Smart COMM and S4A Smart COMM Mobile. Smart4Aviation Technologies, B.V, Leeuwenveldseweg, the Netherlands. Retrieved from the Internet <URL: https://www.smart4aviation.aero/comm>.
(Continued)

*Primary Examiner* — Jungwon Chang
(74) *Attorney, Agent, or Firm* — Womble Bond Dickinson (US) LLP

(57) ABSTRACT

A method of role-based collaboration includes accessing information about a project that includes tasks to be executed, and that includes roles for execution of the tasks, the information including the roles and specified team members assigned to the roles. The method includes creating a conferencing channel for the project, with role-based group membership. The method includes role-based joining the specified team members as group members of the conferencing channel. The specified team members are automatically joined as the group members, which automatically change contemporaneous with any corresponding changes in the specified team members assigned to the roles. The method further includes transferring messages between the group members and thereby the specified team members via the conferencing channel that is accessible to the specified team members from client software running on devices usable by the specified team members.

20 Claims, 5 Drawing Sheets

(51) Int. Cl.
*H04L 65/403* (2022.01)
*G06Q 10/06* (2012.01)
*G06Q 10/10* (2012.01)
*H04L 67/52* (2022.01)

(58) Field of Classification Search
CPC ............... G06Q 10/0637; G06Q 10/10; H04L 12/1818; H04L 51/02; H04L 65/403; H04L 67/18
See application file for complete search history.

(56) References Cited

U.S. PATENT DOCUMENTS

| | | | |
|---|---|---|---|
| 2008/0255918 A1* | 10/2008 | Madhavan | G06F 16/367 705/7.17 |
| 2013/0263020 A1* | 10/2013 | Heiferman | H04L 12/1818 715/753 |
| 2013/0346134 A1* | 12/2013 | Klug | G06Q 10/063114 705/7.15 |
| 2015/0269525 A1* | 9/2015 | Hazy | G06Q 10/0637 434/237 |
| 2018/0268416 A1* | 9/2018 | Ponnusamy | G06Q 30/01 |
| 2019/0392391 A1* | 12/2019 | Slack | G06Q 10/101 |

OTHER PUBLICATIONS

S4A Smart COMM and S4A Smart COMM Mobile. Smart4Aviation Technologies, B.V., Leeuwenveldseweg, the Netherlands. Retrieved on Jun. 23, 2021 from the Internet <URL: https://www.smart4aviation.aero/comm>.

* cited by examiner

FIG. 3

AUTOMATIC CONFERENCING CHANNEL FOR ROLE-BASED COLLABORATION

CROSS-REFERENCE TO RELATED APPLICATION(S)

This application claims priority to U.S. Provisional Application No. 63/057,680, filed Jul. 28, 2020, entitled AUTOMATIC CONFERENCING CHANNEL FOR ROLE-BASED COLLABORATION, the content of which is incorporated herein by reference in its entirety.

TECHNOLOGICAL FIELD

The present disclosure relates generally to role-based collaboration, and in particular, to an automatic conferencing channel for role-based collaboration.

BACKGROUND

Transportation crew and staff typically use communication tools to perform operations. For example, airline personnel typically use various methods of communication during flight turn operations. Such communications may include the use of hardwired phones in the passenger boarding bridge that are connected to the gate, traditional phone lines from the gate to the operations office, very high frequency (VHF) radios from the flight deck to the operations office, handheld radios used from the below wing personnel to the operations office, hardwired channels from the below wing mechanic to the flight deck, and airline personnel's personal mobile phones. Other transportation operations, such as passenger train and cruise ship operations, also use a number of methods of communications. Transportation service providers today lack robust real-time communication tools.

It would therefore be desirable to have a system and method that takes into account at least some of the issues discussed above, as well as other possible issues.

BRIEF SUMMARY

Example implementations of the present disclosure are directed to role-based collaboration for a project that includes tasks to be executed. Example implementations automatically create conferencing channels for projects, with role-based group membership according to team members assigned to roles for execution of tasks of the projects, which may be retrieved from information about the project that is accessible. In the context of an aircraft or a scheduled flight of an aircraft, example implementations may generate a conferencing channel based on ingestion of information such as flight scheduling data like crew and flight planning information, aircraft health maintenance, and other flight-related data.

Individual conferencing channels may be automatically generated for each project based on the assignment of team members to various roles, and the assignment of various roles to each conferencing channel. For example, crew including pilot/co-pilot, ground crew/operations, gate agent, and lead purser may be assigned to a conferencing channel for a specific flight to enable the crew to communicate and provide status, timing updates, and address potential delays or maintenance issues more efficiently and effectively than allowed for with current communication methods. Additionally, the role-based nature of joining team members as group members of a conferencing channel may avoid disruptions in communication when team members assigned to roles unexpectedly change or are reassigned. This automatic generation of the conferencing channel may be accomplished for many if not all scheduled trips of a specific transportation service provider, allowing for the automatic connection and organization of thousands of resources across thousands of trips. Example implementations may also save messages exchanged between the group members to allow for later analysis and/or audits of response time and effectivity, and turnaround time and cause of delays.

The present disclosure thus includes, without limitation, the following example implementations.

Some example implementations provide a method of role-based collaboration, the method comprising accessing information about a project that includes tasks to be executed, and that includes roles for execution of the tasks, the information including the roles and specified team members assigned to the roles; creating a conferencing channel for the project, with role-based group membership, in an online conferencing system; joining the specified team members as group members of the conferencing channel according to the roles to which the specified team members are assigned, the specified team members automatically joined as the group members of the conferencing channel, and the group members of the conferencing channel automatically changing contemporaneous with any corresponding changes in the specified team members assigned to the roles; and transferring messages between the group members and thereby the specified team members via the conferencing channel that is accessible to the specified team members from client software running on devices usable by the specified team members.

In some example implementations of the method of any preceding example implementation, or any combination of any preceding example implementations, accessing the information about the project includes accessing the information including role identifiers for the roles, and wherein joining the specified team members includes joining the specified team members as the group members that are identified in the conferencing channel by at least the role identifiers of the roles to which the specified team members are assigned.

In some example implementations of the method of any preceding example implementation, or any combination of any preceding example implementations, transferring the messages includes transferring the messages via the conferencing channel that is accessible to the specified team members from the client software embodied as a software application accessible to all of the specified team members.

In some example implementations of the method of any preceding example implementation, or any combination of any preceding example implementations, transferring the messages includes transferring the messages via the conferencing channel that is accessible to the specified team members from the client software integrated with role-based software applications accessible to the specified team members according to the roles to which the specified team members are assigned.

In some example implementations of the method of any preceding example implementation, or any combination of any preceding example implementations, the project is a scheduled trip with a transportation service provider that includes at least crew roles, and accessing the information includes accessing the information from at least one transportation operations planning system.

In some example implementations of the method of any preceding example implementation, or any combination of any preceding example implementations, the project is a scheduled flight of an aircraft that includes at least flight crew and ground crew, and accessing the information includes accessing the information from at least one airline operations planning system, and wherein transferring the messages includes transferring the messages via the conferencing channel that is accessible to the specified team members from the client software running on the devices including at least an electronic flight bag (EFB).

In some example implementations of the method of any preceding example implementation, or any combination of any preceding example implementations, the method further comprises accessing a chatbot with access to the information about the project, the chatbot configured to receive the messages, and automatically for at least some of the messages, identify any responsive information about the project, and reply with the responsive information; and joining the chatbot as an additional one of the group members of the conferencing channel.

Some example implementations provide an apparatus, comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 3 illustrates a graphical user interface (GUI) of client software from which a conferencing channel of a conferencing system is accessible, according to some example implementations;

DETAILED DESCRIPTION

Figure 1:
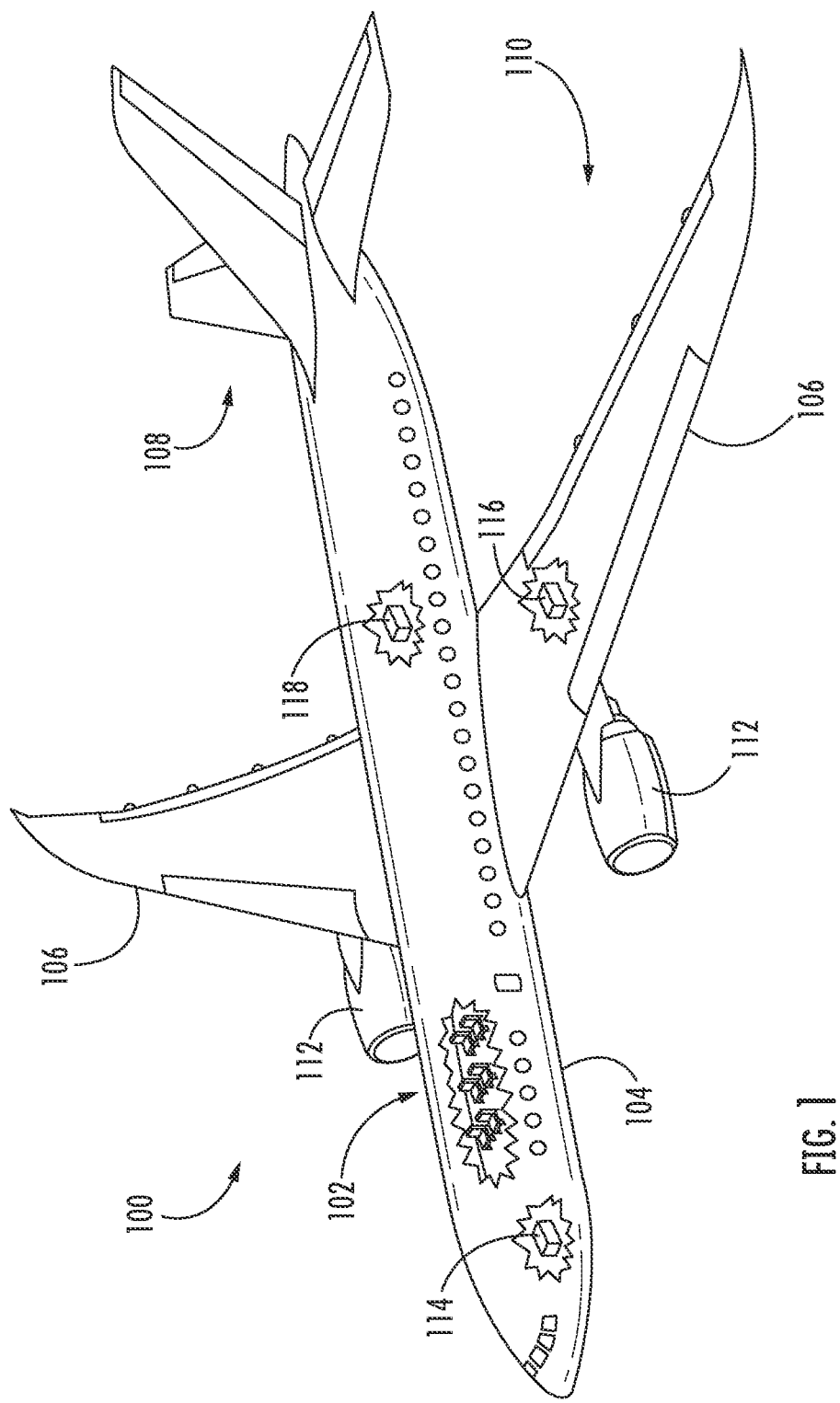
FIG. 1 illustrates an aircraft according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to role-based collaboration, and in particular, to an automatic conferencing channel for role-based collaboration for a project that includes tasks to be executed, such as to realize a particular deliverable. While example implementations will be primarily described in conjunction with projects in the airline industry, it should be understood that example implementations may be utilized in conjunction with a variety of other projects in a variety of other industries. One example of a larger industry sector is the transportation sector in which projects involve the movement of people and products, and/or the vehicles or other means on which they are moved. These vehicles include, for example, rotorcraft, spacecraft, watercraft, motor vehicles, railed vehicles and the like.

More particular examples of suitable projects include scheduled trips with a transportation service provider, such as a scheduled flight of an aircraft, rotorcraft, spacecraft, watercraft, motor vehicle, railed vehicle or the like. In other examples, projects may be or include a vehicle such as service or maintenance of a vehicle. In some of these examples, a conferencing channel may be automatically created for a particular vehicle, and its group members may include those assigned to maintenance tasks dealing with that particular vehicle. In yet other examples, projects may include operation of a business, facility, station (e.g., airport, space station, bus station, train station, port), coordinated operations such as military operations, or the like. In some of these examples, a conferencing channel may be automatically created for a particular station, and its group members may include station managers for that particular station.

FIG. 1 illustrates one type of aircraft 100 in the commercial airline industry that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other implementations, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
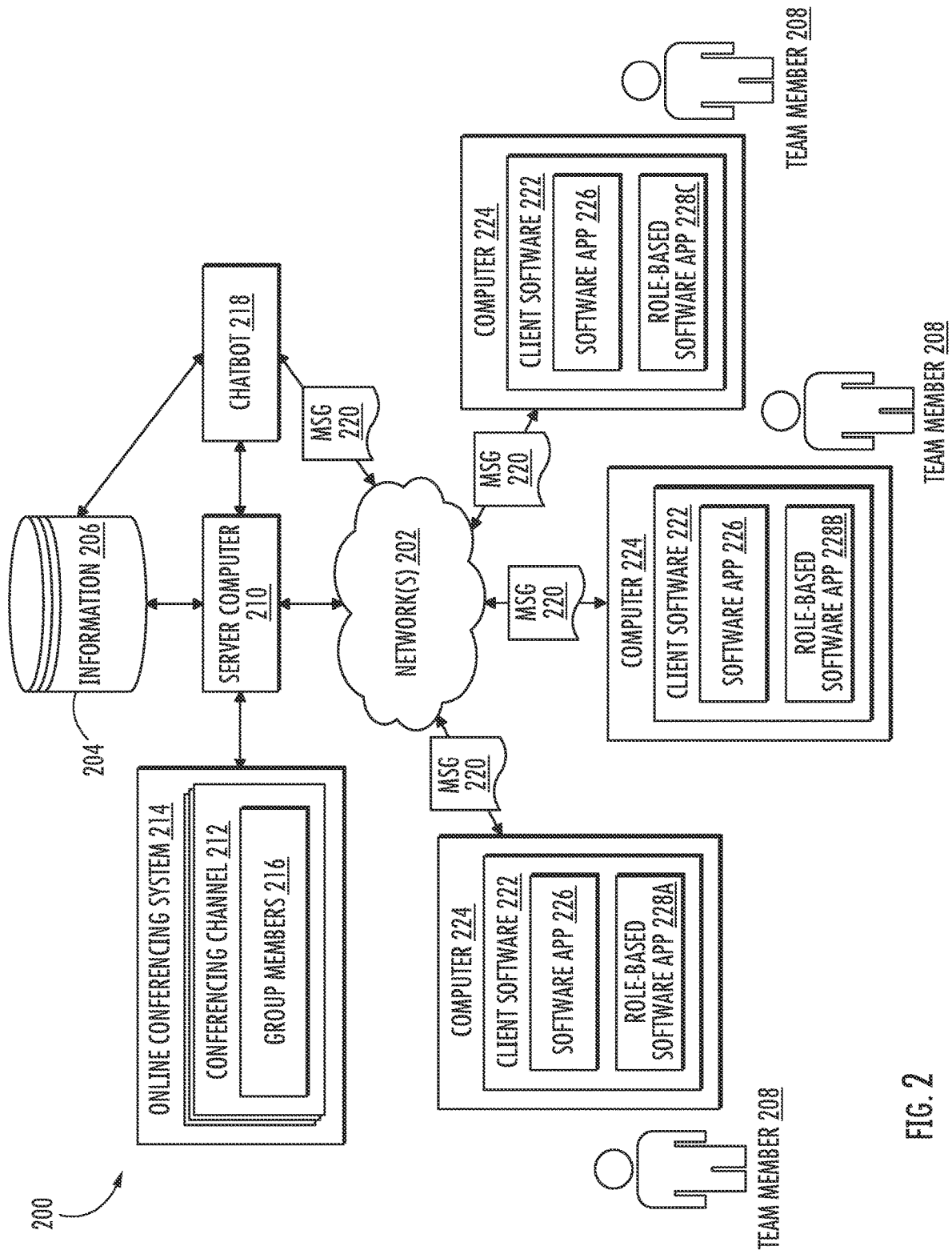
FIG. 2 illustrates a system for role-based collaboration, according to some example implementations.

FIG. 2 illustrates a system 200 for role-based collaboration for a project such as a scheduled flight of an aircraft like the aircraft 100 of FIG. 1, according to some example implementations. The system may include any of a number of different subsystems, tools and the like (each an individual system) for performing one or more functions or operations. The subsystems, tools and the like of the system may be co-located or directly coupled to one another. In some examples, various ones of the subsystems, tools and the like may communicate with one another across one or more computer networks 202. Further, although shown as part of the system, it should be understood that any one or more of the subsystems, tools and the like may function or operate as a separate system without regard to any of the other subsystems, tools and the like. It should also be understood that the system may include one or more additional or alternative subsystems, tools and the like than those shown in FIG. 2.

As shown, in some examples, the system 200 includes at least one source 204 of information 206 about a project that includes tasks to be executed, such as to realize a particular deliverable, and that includes roles for execution of the tasks. In examples in which the project is a scheduled trip with a transportation service provider such as a scheduled flight of an aircraft, the roles may include crew roles such as flight crew, ground crew and the like. More specific examples include pilot, co-pilot, cabin crew (e.g., lead purser), gate crew (e.g., gate agent), ramp crew, maintenance, engineering and the like.

In some examples, the source 204 includes a memory that may be located at a single source or distributed across multiple sources. The source may be or include one or more project management systems, workflow management systems or the like. In some examples the project is a scheduled trip with a transportation service provider that includes at least crew roles; and in some of these examples, the source may be or include at least one transportation operations planning system. In the context of an airline, this may include at least one airline operations planning system. More particular examples include systems for flight planning, fleet assignment, operations control, airplane health management, crew scheduling and the like.

The information 206 may be stored in a number of different manners, such as in a database or flat files of any of a number of different types or formats. For the project that includes roles for execution of tasks, the information includes the roles and specified team members 208 assigned to the roles. In some examples, the information includes role identifiers for the roles. The specified team members are team members that are specified in the information, and which may be specified in any of a number of different manners. For example, a specified team member may be specified by proper name, nickname, username, handle or the like. In other examples, a specified team member may be specified by a pseudonym or alias that the team member assumes for a particular purpose such as their role for execution of a task of the project.

The system 200 of example implementations of the present disclosure includes a device such as a server computer 210 configured to access the information 206 about the project, including the roles and specified team members 208 assigned to the roles. In some examples in which the project is a scheduled trip with a transportation service provider that includes at least crew roles, the server computer is configured to access the information from at least one transportation operations planning system (source 204). In the case of a scheduled flight of an aircraft that includes at least flight crew and ground crew, the at least one transportation operations planning system may be or include at least one airline operations planning system.

The server computer 210 is configured to create a conferencing channel 212 for the project, with role-based group membership, in an online conferencing system 214. The conferencing channel may be any of a number of different types of conferencing channels that allow its group members to communicate in real-time or near-real-time, and that may also include the capability of buffering communications of or for group members while offline. More particular examples include chat rooms, instant messaging systems that include multi-user chat functionality, and the like. In some examples, the server computer, the online conferencing system or both may be implemented in a cloud computing architecture. In some of these examples, then, the conferencing channel may be a cloud-based communication channel.

The server computer 210 is configured to join the specified team members 208 as group members 216 of the conferencing channel 212 according to the roles to which the specified team members 208 are assigned. In some examples, the server computer 210 is also configured to access a chatbot 218 with access to the information 206 about the project, and join the chatbot as an additional one of the group members 216 of the conferencing channel 212. According to example implementations, the specified team members are automatically joined as the group members of the conferencing channel. In some examples in which the information 206 includes role identifiers for the roles, the server computer is configured to join the specified team members as the group members that are identified in the conferencing channel by at least the role identifiers of the roles to which the specified team members are assigned.

The server computer 210 may further automatically account for any changes in the specified team members 208 assigned to the roles for execution of tasks of the project, or changes in the roles or tasks that lead to changes in the specified team members. In some examples, then, the server computer is configured to automatically (or dynamically, automatically in some further examples) change the group members 216 of the conferencing channel 212 contemporaneous with any corresponding changes in the specified team members assigned to the roles. The server computer may determine changes in the specified team members in a number of different manners. For example, the server computer may periodically request information 204 from the source 202 that indicates changes in the specified team members or from which the server computer is configured to determine any changes. In another example, the server computer may receive push notifications from the source that indicates changes in the specified team members or from which the server computer is configured to determine any changes.

Regardless of the particular manner by which the server computer 210 joins or changes group members 216 of the conferencing channel 212, the server computer is further configured to transfer messages 220 between the group members and thereby the specified team members 208 via the conferencing channel. The chatbot is configured to receive messages, and automatically for at least some of the messages, identify any responsive information about the project, and reply with the responsive information. The messages may be sent, received and viewed by the group members via the conferencing channel.

In some examples, the server computer 210 may perform one or more further operations on messages 220 that are transferred between the group members 216. The server computer may create the conferencing channel 212 in which group members have role-based access rights to view messages from certain ones of the group members, messages with certain content, or the like. In these examples, the server computer may transfer messages based on the role-based access rights of the group members, which may include a text analysis of the messages. In some examples, the server computer may be additionally or alternatively configured to save or otherwise store the messages such as to allow for later analysis of response time and effectivity with respect to the project, and turnaround time and cause of delays.

The conferencing channel 212 is accessible to the specified team members 208 from client software 222 running on user devices such as computers 224 usable by the specified team members. The client software may be provided in any of a number of different manners, such as by one or more software applications like web portals, web applications, application programs, mobile apps or the like. In some examples, the client software is embodied as a software application 226 accessible to all of the specified team members. In some examples, the client software is integrated with role-based software applications 228A, 228B, 228C accessible to the specified team members according to the roles to which the specified team members are assigned. Examples of suitable role-based software applications include Jeppesen Aviator, Jeppesen Crew Tracking including its Crew Access and Crew Exchange add-on modules, Boeing AHM Notify, Boeing Toolbox Mobile and the like. In a more particular example in which the project is a scheduled flight of an aircraft that includes at least flight crew and ground crew, the client software runs on the user devices (e.g., computers) including at least an electronic flight bag (EFB) accessible to flight crew or more particularly flight deck crew. One example is Jeppesen Aviator that runs on an EFB.

Figure 3:
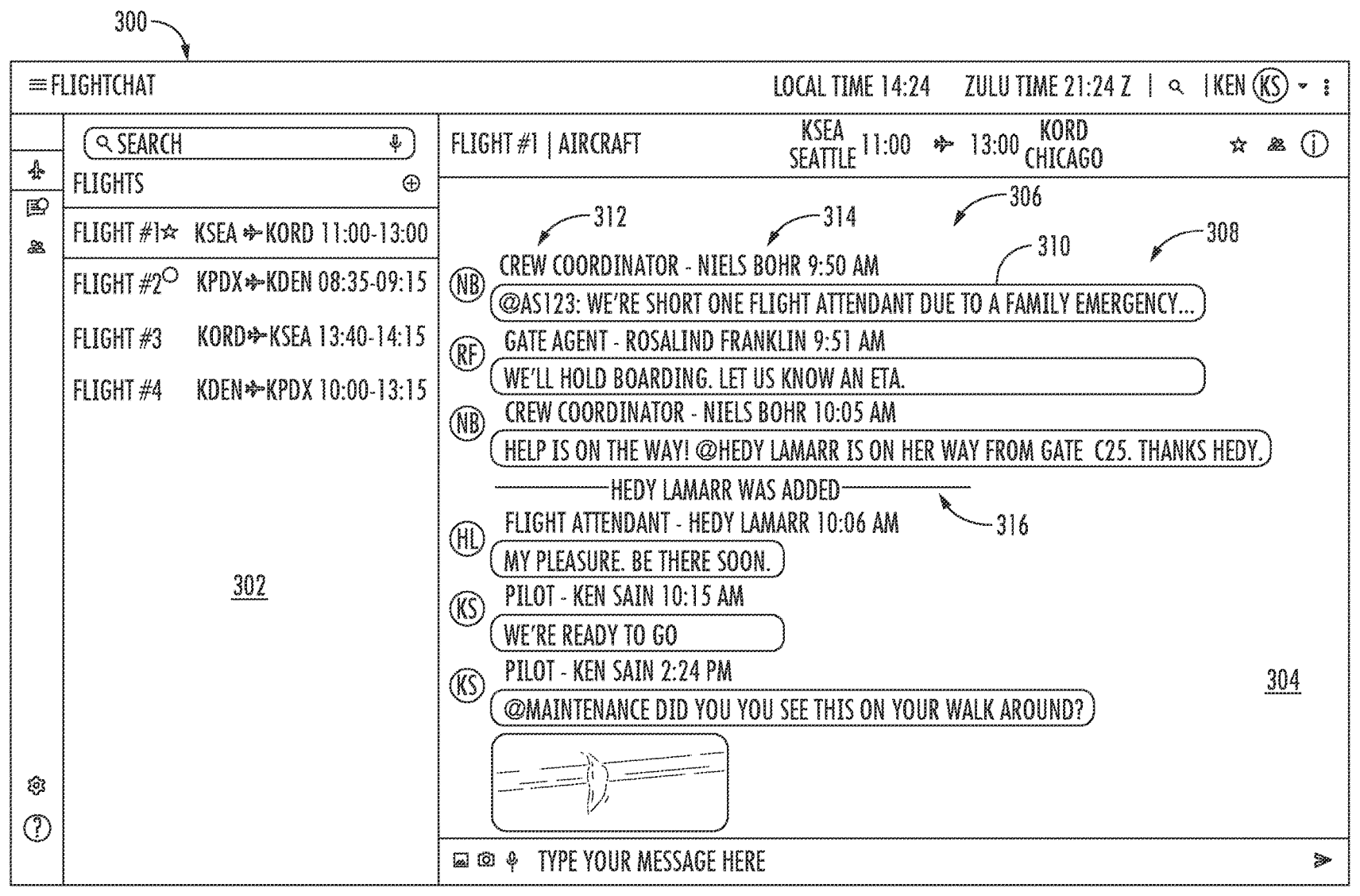

FIG. 3 illustrates a graphical user interface (GUI) 300 of the client software 222 from which the conferencing channel 212 of the conferencing system 214 is accessible, according to some example implementations of the present disclosure. In the context of the GUI, the project is a scheduled flight of an aircraft that includes crew roles and in particular flight crew and ground crew. The conferencing channel is for a Flight #1 of an Aircraft, and it is one of a number of conferencing channels for flights that are accessible in the GUI. In this regard, the GUI includes a pane 302 from which the conferencing channels for flights may be selected, including Flight #1, as well as Flight #2, Flight #3 and Flight #4.

The GUI 300 also includes a second pane 304 from which the conferencing channel 212 for the selected Flight #1. In the illustrated example, the conferencing channel is embodied as a chat room 306 in which the specified team members 208 assigned to crew roles for the flight are joined as the group members 216. In the chat room, the specified team members may share information or otherwise exchange messages 308 (one of which is called out in the figure), which in some examples correspond to messages 220. As shown, the crew roles include a Crew Coordinator, Gate Agent, Flight Attendant and Pilot assigned to specified team members Niels Bohr, Rosalind Franklin, Hedy Lamarr and Ken Sain. For each message from a specified team member, the chat room includes the message content 310, and may also indicate the sender 312 (by both role identifier and name) and time 314 when the message was shared on in the chat room. The message content may include content of any of a number of different types, including text, images (still or video) and/or audio.

As also shown, the chat room 306 may indicate when a specified team member 208 was added 316. This may coincide with a change in the specified team members assigned to the crew roles for the flight, such as when a specified team member is later assigned to a role and added as a group member 216 of the conferencing channel 212. Similarly, in another example not shown, the chat room may indicate when a specified team member was removed or otherwise left the chat room. This may also coincide with a change in the specified team members, but when a specified team member is removed from an assigned role and thereby removed as a group member of the conferencing channel.

Figure 4:
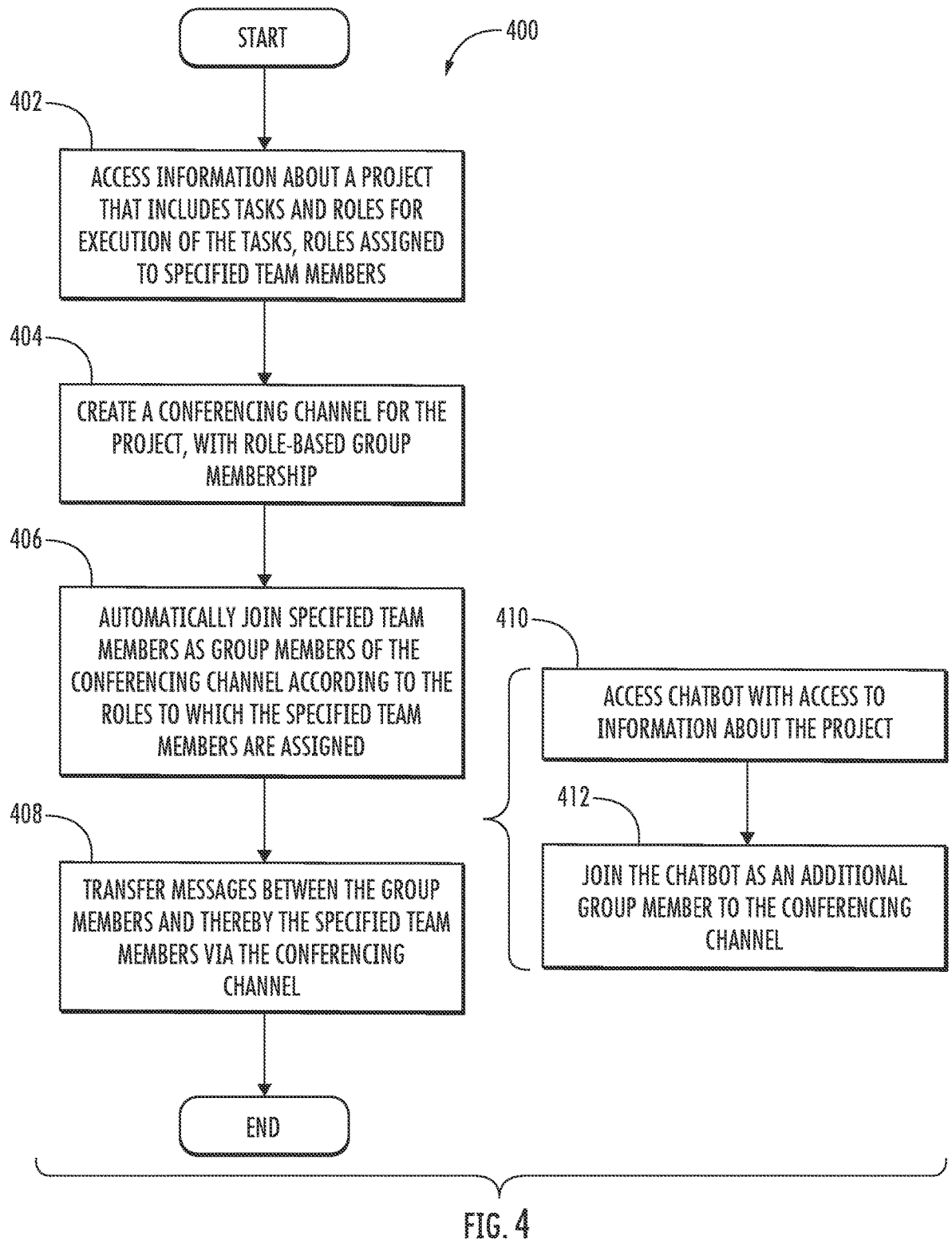
FIG. 4 is a flowchart illustrating various steps in a method of role-based collaboration, according to example implementations.

FIG. 4 is a flowchart illustrating various steps in a method 400 of role-based collaboration, according to example implementations of the present disclosure. The method includes accessing information about a project that includes tasks to be executed, and that includes roles for execution of the tasks, the information including the roles and specified team members assigned to the roles, as shown at block 402. The method includes creating a conferencing channel for the project, with role-based group membership, in an online conferencing system, as shown at block 404.

As shown at block 406, the method 400 includes joining the specified team members as group members of the conferencing channel according to the roles to which the specified team members are assigned. The specified team members are automatically joined as the group members of the conferencing channel. Similarly, the group members of the conferencing channel automatically change contemporaneous with any corresponding changes in the specified team members assigned to the roles. The method also includes transferring messages between the group members and thereby the specified team members via the conferencing channel that is accessible to the specified team members from client software running on user devices such as computers usable by the specified team members, as shown at block 408.

In some examples, accessing the information about the project at block 402 includes accessing the information including role identifiers for the roles. In some of these examples, joining the specified team members at block 406 includes joining the specified team members as the group members that are identified in the conferencing channel by at least the role identifiers of the roles to which the specified team members are assigned.

In some examples, transferring the messages at block 408 includes transferring the messages via the conferencing channel that is accessible to the specified team members from the client software embodied as a software application accessible to all of the specified team members. In some examples, transferring the messages includes transferring the messages via the conferencing channel that is accessible to the specified team members from the client software integrated with role-based software applications accessible to the specified team members according to the roles to which the specified team members are assigned.

In some examples, the project is a scheduled trip with a transportation service provider that includes at least crew roles. In some of these examples, accessing the information at block 402 includes accessing the information from at least one transportation operations planning system.

In some examples, the project is a scheduled flight of an aircraft that includes at least flight crew and ground crew. In some of these examples, accessing the information at block 402 includes accessing the information from at least one airline operations planning system. Also in some of these examples, transferring the messages at block 408 includes transferring the messages via the conferencing channel that is accessible to the specified team members from the client software running on the user devices (e.g., computers) including at least an electronic flight bag (EFB).

In some examples, the method 400 further comprises accessing a chatbot with access to the information about the project, and joining the chatbot as an additional one of the group members of the conferencing channel, as shown at blocks 410 and 412. The chatbot is configured to receive messages, and automatically for at least some of the messages, identify any responsive information about the project, and reply with the responsive information.

According to example implementations of the present disclosure, the system 200 and its subsystems, tools and the like, including the source 204, server computer 210, online conferencing system 214, chatbot 218 and computers 224, may be implemented by various means. Means for implementing the system and its subsystems, tools and the like may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
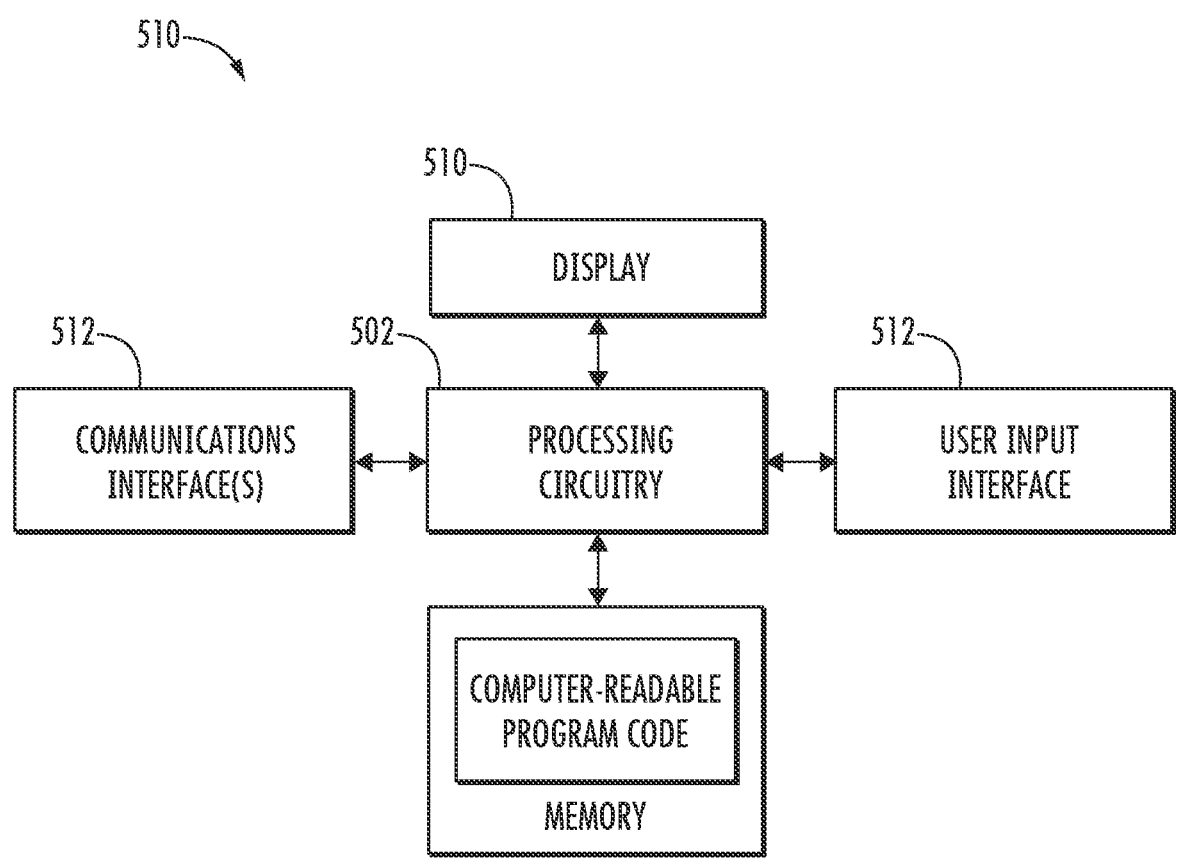
FIG. 5 illustrates an apparatus according to some example implementations.

FIG. 5 illustrates an apparatus 500 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitrys which perform the specified functions, or combinations of special purpose hardware and program code instructions.

Clause 1: An apparatus comprising a memory configured to store computer-readable program code; and processing circuitry configured to access the memory, and execute the computer-readable program code to cause the apparatus to at least access information about a project that includes tasks to be executed, and that includes roles for execution of the tasks, the information including the roles and specified team members assigned to the roles; create a conferencing channel for the project, with role-based group membership, in an online conferencing system; join the specified team members as group members of the conferencing channel according to the roles to which the specified team members are assigned, the specified team members automatically joined as the group members of the conferencing channel, and the apparatus caused to automatically change the group members of the conferencing channel contemporaneous with any corresponding changes in the specified team members assigned to the roles; and transfer messages between the group members and thereby the specified team members via the conferencing channel that is accessible to the specified team members from client software running on user devices usable by the specified team members.

Clause 2: The apparatus of Clause 1, wherein the apparatus caused to access the information about the project includes the apparatus caused to access the information including role identifiers for the roles, and wherein the apparatus caused to join the specified team members includes the apparatus caused to join the specified team members as the group members that are identified in the conferencing channel by at least the role identifiers of the roles to which the specified team members are assigned.

Clause 3: The apparatus of Clause 1 or 2, wherein the apparatus caused to transfer the messages includes the apparatus caused to transfer the messages via the conferencing channel that is accessible to the specified team members from the client software embodied as a software application accessible to all of the specified team members.

Clause 4: The apparatus of any of Clauses 1-3, wherein the apparatus caused to transfer the messages includes the apparatus caused to transfer the messages via the conferencing channel that is accessible to the specified team members from the client software integrated with role-based software applications accessible to the specified team members according to the roles to which the specified team members are assigned.

Clause 5: The apparatus of any of Clauses 1-4, wherein the project is a scheduled trip with a transportation service provider that includes at least crew roles, and the apparatus caused to access the information includes the apparatus caused to access the information from at least one transportation operations planning system.

Clause 6: The apparatus of any of Clauses 1-5, wherein the project is a scheduled flight of an aircraft that includes at least flight crew and ground crew, and the apparatus caused to access the information includes the apparatus caused to access the information from at least one airline operations planning system, and wherein the apparatus caused to transfer the messages includes the apparatus caused to transfer the messages via the conferencing channel that is accessible to the specified team members from the client software running on the user devices including at least an electronic flight bag (EFB).

Clause 7: The apparatus of any of Clauses 1-6, wherein the processing circuitry is configured to execute the computer-readable program code to cause the apparatus to further at least access a chatbot with access to the information about the project, the chatbot configured to receive the messages, and automatically for at least some of the messages, identify any responsive information about the project, and reply with the responsive information; and join the chatbot as an additional one of the group members of the conferencing channel.

Clause 8: A method comprising accessing information about a project that includes tasks to be executed, and that includes roles for execution of the tasks, the information including the roles and specified team members assigned to the roles; creating a conferencing channel for the project, with role-based group membership, in an online conferencing system; joining the specified team members as group members of the conferencing channel according to the roles to which the specified team members are assigned, the specified team members automatically joined as the group members of the conferencing channel, and the group members of the conferencing channel automatically changing contemporaneous with any corresponding changes in the specified team members assigned to the roles; and transferring messages between the group members and thereby the specified team members via the conferencing channel that is accessible to the specified team members from client software running on user devices usable by the specified team members.

Clause 9: The method of Clause 8, wherein accessing the information about the project includes accessing the information including role identifiers for the roles, and wherein joining the specified team members includes joining the specified team members as the group members that are identified in the conferencing channel by at least the role identifiers of the roles to which the specified team members are assigned.

Clause 10: The method of Clause 8 or 9, wherein transferring the messages includes transferring the messages via the conferencing channel that is accessible to the specified team members from the client software embodied as a software application accessible to all of the specified team members.

Clause 11: The method of any of Clauses 8-10, wherein transferring the messages includes transferring the messages via the conferencing channel that is accessible to the specified team members from the client software integrated with role-based software applications accessible to the specified team members according to the roles to which the specified team members are assigned.

Clause 12: The method of any of Clauses 8-11, wherein the project is a scheduled trip with a transportation service provider that includes at least crew roles, and accessing the information includes accessing the information from at least one transportation operations planning system.

Clause 13: The method of any of Clauses 8-12, wherein the project is a scheduled flight of an aircraft that includes at least flight crew and ground crew, and accessing the information includes accessing the information from at least one airline operations planning system, and wherein transferring the messages includes transferring the messages via the conferencing channel that is accessible to the specified team members from the client software running on the user devices including at least an electronic flight bag (EFB).

Clause 14: The method of any of Clauses 8-13, further comprising accessing a chatbot with access to the information about the project, the chatbot configured to receive the messages, and automatically for at least some of the messages, identify any responsive information about the project, and reply with the responsive information; and joining the chatbot as an additional one of the group members of the conferencing channel.

Clause 15: A system, comprising a device configured to at least: access information about a project that includes tasks to be executed, and that includes roles for execution of the tasks, the information including the roles and specified team members assigned to the roles; create a conferencing channel for the project, with role-based group membership, in an online conferencing system; and join the specified team members as group members of the conferencing channel according to the roles to which the specified team members are assigned, the specified team members automatically joined as the group members of the conferencing channel, and the device configured to automatically change the group members of the conferencing channel contemporaneous with any corresponding changes in the specified team members assigned to the roles; and a plurality of user devices usable by the specified team members to transfer messages between the group members, the plurality of user devices configured to run client software from which the conferencing channel is accessible to the specified team members, the device configured to transfer the messages between the group members and thereby the specified team members via the conferencing channel.

Clause 16: The system of Clause 15, wherein the device configured to access the information about the project includes the device configured to access the information including role identifiers for the roles, and wherein the device configured to join the specified team members includes the device configured to join the specified team members as the group members that are identified in the conferencing channel by at least the role identifiers of the roles to which the specified team members are assigned.

Clause 17: The system of Clause 15 or 16, wherein the plurality of user devices are configured to run the client software embodied as a software application accessible to all of the specified team members.

Clause 18: The system of any of Clauses 15-17, wherein the plurality of user devices are configured to run the client software integrated with role-based software applications accessible to the specified team members according to the roles to which the specified team members are assigned.

Clause 19: The system of any of Clauses 15-18, wherein the project is a scheduled trip with a transportation service provider that includes at least crew roles, and the device configured to access the information includes the device configured to access the information from at least one transportation operations planning system.

Clause 20: The system of any of Clauses 15-19, wherein the project is a scheduled flight of an aircraft that includes at least flight crew and ground crew, and the device configured to access the information includes the device configured to access the information from at least one airline operations planning system, and wherein the plurality of user devices are configured to run the client software include at least an electronic flight bag (EFB).

Clause 21: The system of any of Clauses 15-20 further comprising a chatbot with access to the information about the project, the chatbot configured to receive the messages, and automatically for at least some of the messages, identify any responsive information about the project, and reply with the responsive information, wherein the device is further configured to join the chatbot as an additional one of the group members of the conferencing channel.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
a memory configured to store computer-readable program code; and
processing circuitry configured to access the memory, and execute the computer-readable program code to cause the apparatus to at least:
access information about a project that includes tasks to be executed, and that includes roles for execution of the tasks, the information including the roles and specified team members assigned to the roles;
create a conferencing channel for the project, with role-based group membership, in an online conferencing system;
join the specified team members as group members of the conferencing channel according to the roles to which the specified team members are assigned, the specified team members automatically joined as the group members of the conferencing channel, and the apparatus caused to automatically change the group members of the conferencing channel contemporaneous with any corresponding changes in the specified team members assigned to the roles; and
transfer messages between the group members and thereby the specified team members via the conferencing channel that is accessible to the specified team members from client software running on user devices usable by the specified team member,
wherein the project is a scheduled trip with a transportation service provider that includes at least crew roles, and the apparatus caused to access the information includes the apparatus caused to access the information from at least one transportation operations planning system.

2. The apparatus of claim 1, wherein the apparatus caused to access the information about the project includes the apparatus caused to access the information including role identifiers for the roles, and
wherein the apparatus caused to join the specified team members includes the apparatus caused to join the specified team members as the group members that are identified in the conferencing channel by at least the role identifiers of the roles to which the specified team members are assigned.

3. The apparatus of claim 1, wherein the apparatus caused to transfer the messages includes the apparatus caused to transfer the messages via the conferencing channel that is accessible to the specified team members from the client software embodied as a software application accessible to all of the specified team members.

4. The apparatus of claim 1, wherein the apparatus caused to transfer the messages includes the apparatus caused to transfer the messages via the conferencing channel that is accessible to the specified team members from the client software integrated with role-based software applications accessible to the specified team members according to the roles to which the specified team members are assigned.

5. The apparatus of claim 1, wherein the project is a scheduled flight of an aircraft that includes at least flight crew and ground crew, and the apparatus caused to access the information includes the apparatus caused to access the information from at least one airline operations planning system, and
wherein the apparatus caused to transfer the messages includes the apparatus caused to transfer the messages via the conferencing channel that is accessible to the specified team members from the client software running on the user devices including at least an electronic flight bag (EFB).

6. The apparatus of claim 1, wherein the processing circuitry is configured to execute the computer-readable program code to cause the apparatus to further at least:
access a chatbot with access to the information about the project, the chatbot configured to receive the messages, and automatically for at least some of the messages, identify any responsive information about the project, and reply with the responsive information; and
join the chatbot as an additional one of the group members of the conferencing channel.

7. The apparatus of claim 1, wherein the project is a scheduled flight of an aircraft that includes at least flight crew and ground crew, and the apparatus caused to access the information includes the apparatus caused to access the information from at least one airline operations planning system.

8. A method, comprising:
accessing information about a project that includes tasks to be executed, and that includes roles for execution of the tasks, the information including the roles and specified team members assigned to the roles;
creating a conferencing channel for the project, with role-based group membership, in an online conferencing system;
joining the specified team members as group members of the conferencing channel according to the roles to which the specified team members are assigned, the specified team members automatically joined as the group members of the conferencing channel, and the group members of the conferencing channel automatically changing contemporaneous with any corresponding changes in the specified team members assigned to the roles; and
transferring messages between the group members and thereby the specified team members via the conferencing channel that is accessible to the specified team members from client software running on user devices usable by the specified team members,
wherein the project is a scheduled trip with a transportation service provider that includes at least crew roles, and accessing the information includes accessing the information from at least one transportation operations planning system.

9. The method of claim 8, wherein accessing the information about the project includes accessing the information including role identifiers for the roles, and wherein joining the specified team members includes joining the specified team members as the group members that are identified in the conferencing channel by at least the role identifiers of the roles to which the specified team members are assigned.

10. The method of claim 8, wherein transferring the messages includes transferring the messages via the conferencing channel that is accessible to the specified team members from the client software embodied as a software application accessible to all of the specified team members.

11. The method of claim 8, wherein transferring the messages includes transferring the messages via the conferencing channel that is accessible to the specified team members from the client software integrated with role-based software applications accessible to the specified team members according to the roles to which the specified team members are assigned.

12. The method of claim 8, wherein the project is a scheduled flight of an aircraft that includes at least flight crew and ground crew, and accessing the information includes accessing the information from at least one airline operations planning system, and
wherein transferring the messages includes transferring the messages via the conferencing channel that is accessible to the specified team members from the client software running on the user devices including at least an electronic flight bag (EFB).

13. The method of claim 8 further comprising:
accessing a chatbot with access to the information about the project, the chatbot configured to receive the messages, and automatically for at least some of the messages, identify any responsive information about the project, and reply with the responsive information; and
joining the chatbot as an additional one of the group members of the conferencing channel.

14. The method of claim 8, wherein the project is a scheduled flight of an aircraft that includes at least flight crew and ground crew, and accessing the information includes accessing the information from at least one airline operations planning system.

15. A system, comprising:
a server computer;
an information source communicatively coupled to the server computer and including information about a project that includes tasks to be executed, and that includes roles for execution of the tasks, the information including the roles and specified team members assigned to the roles; and
an online conferencing system coupled to the server computer,
wherein the server computer is configured to at least:
create a conferencing channel for the project, with role-based group membership, in an online conferencing system;
join the specified team members as group members of the conferencing channel according to the roles to which the specified team members are assigned, the specified team members automatically joined as the group members of the conferencing channel; and
automatically change the group members of the conferencing channel contemporaneous with any corresponding changes in the specified team members assigned to the roles,
wherein the project is a scheduled trip with a transportation service provider that includes at least crew roles, and the information source includes at least one transportation operations planning system.

16. The system of claim 15 further comprising:
a plurality of user devices usable by the specified team members to transfer messages between the group members, the plurality of user devices configured to run client software from which the conferencing channel is accessible to the specified team members, the server computer configured to transfer the messages between the group members and thereby the specified team members via the conferencing channel.

17. The system of claim 15, wherein the information about the project includes role identifiers for the roles, and the server computer configured to join the specified team members includes the server computer configured to join the specified team members as the group members that are identified in the conferencing channel by at least the role identifiers of the roles to which the specified team members are assigned.

18. The system of claim 15, wherein the project is a scheduled flight of an aircraft that includes at least flight crew and ground crew, and the information source includes at least one airline operations planning system, and
wherein the conferencing channel is accessible to the specified team members from client software running on a plurality of user devices usable by the specified team members, the plurality of user devices including at least an electronic flight bag (EFB).

19. The system of claim 15 further comprising:
a chatbot configured to receive the messages, and automatically for at least some of the messages, identify any responsive information about the project, and reply with the responsive information,
wherein the server computer is configured to join the chatbot as an additional one of the group members of the conferencing channel.

20. The system of claim 15, wherein the project is a scheduled flight of an aircraft that includes at least flight crew and ground crew, and the information source includes at least one airline operations planning system.

* * * * *

UNITED STATES PATENT AND TRADEMARK OFFICE
CERTIFICATE OF CORRECTION

| | | |
|---|---|---|
| PATENT NO. | : 11,356,391 B2 | Page 1 of 1 |
| APPLICATION NO. | : 17/355985 | |
| DATED | : June 7, 2022 | |
| INVENTOR(S) | : Kenneth W. Sain et al. | |

It is certified that error appears in the above-identified patent and that said Letters Patent is hereby corrected as shown below:

In the Claims

Column 15, Claim 1, Line 47, "team member, wherein" should read -- team members, wherein --

Signed and Sealed this
Second Day of August, 2022

*Katherine Kelly Vidal*

Katherine Kelly Vidal
*Director of the United States Patent and Trademark Office*